US011482345B2

(12) United States Patent
Hunt et al.

(10) Patent No.: US 11,482,345 B2
(45) Date of Patent: Oct. 25, 2022

(54) METHODS OF CONSTRUCTING NUCLEAR POWER PLANTS WITH GEOTHERMAL PASSIVE COOLING

(71) Applicant: GE-Hitachi Nuclear Energy Americas LLC, Wilmington, NC (US)

(72) Inventors: Brian S. Hunt, Wilmington, NC (US); Scott E. Rasmussen, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 475 days.

(21) Appl. No.: 16/206,201

(22) Filed: Nov. 30, 2018

(65) Prior Publication Data
US 2020/0027594 A1     Jan. 23, 2020

Related U.S. Application Data

(60) Provisional application No. 62/594,528, filed on Dec. 4, 2017.

(51) Int. Cl.
*G21C 15/18*     (2006.01)
*G21C 15/243*     (2006.01)
(Continued)

(52) U.S. Cl.
CPC .......... *G21C 15/18* (2013.01); *G21C 15/243* (2013.01); *G21C 11/022* (2013.01);
(Continued)

(58) Field of Classification Search
CPC ............................. G21C 15/18; G21C 15/243
(Continued)

(56) References Cited

U.S. PATENT DOCUMENTS 1,823,661 A * 9/1931 O'Brien ................. F24T 10/10
                                                                                165/103
3,207,671 A * 9/1965 Kornbichler ........... G21C 15/18
                                                                                376/293
(Continued)

FOREIGN PATENT DOCUMENTS

| CN | 102032716 | 10/2012 |
|---|---|---|
| CN | 202543904 | 11/2012 |

(Continued)

OTHER PUBLICATIONS

Pinto, "A survey of the underground siting of nuclear power plants", No. EIR-382, Eidgenoessisches Inst. fuer Reaktorforschung, 1979. (Year: 1979).*

(Continued)

*Primary Examiner* — Jack W Keith
*Assistant Examiner* — Daniel Wasil
(74) *Attorney, Agent, or Firm* — Ryan Alley IP

(57) ABSTRACT

Passive safety systems cool reactors using surrounding ground as a heat sink. A coolant flow channel may loop around the reactor and then pass outside, potentially through a containment building, into surrounding ground. No active components need be used in example embodiment safety systems, which may be driven entirely by gravity-based natural circulation. The coolant loop may be air-tight and seismically-hardened and filled with any coolant such as water, air, nitrogen, a noble gas, a refrigerant, etc. The ground may include a soil of grey limestone, soft grey fine sandy clay, grey slightly silty sandy gravel, etc. or any other fill with desired heat-transfer characteristics. Coolant fins and/or jackets with secondary coolants may be used on the coolant loop. The coolant loop may be buried at any constant or variable depth, and the reactor and containment may also be buried in the ground.

12 Claims, 5 Drawing Sheets

(51) Int. Cl.
  *G21C 11/02* (2006.01)
  *G21C 15/247* (2006.01)
  *G21C 17/025* (2006.01)
(52) U.S. Cl.
  CPC ......... *G21C 15/182* (2013.01); *G21C 15/247* (2013.01); *G21C 17/025* (2013.01)
(58) Field of Classification Search
  USPC ........................................................ 376/299
  See application file for complete search history.

(56) References Cited

U.S. PATENT DOCUMENTS

| | | | |
|---|---|---|---|
| 4,851,183 A | | 7/1989 | Hampel |
| 4,959,193 A | | 9/1990 | Hunsbedt et al. |
| 5,190,720 A | | 3/1993 | Hunbedt et al. |
| 5,223,208 A | * | 6/1993 | Ishimaru ................ G21C 15/18 376/298 |
| 5,223,210 A | | 6/1993 | Hunsbedt et al. |
| 5,406,602 A | | 4/1995 | Hunsbedt et al. |
| 5,499,277 A | * | 3/1996 | Hunsbedt ............... G21C 15/18 376/299 |
| 5,816,314 A | | 10/1998 | Wiggs et al. |
| 6,814,866 B1 | | 11/2004 | Potts |
| 7,048,037 B2 | | 5/2006 | McNair |
| 7,617,697 B2 | | 11/2009 | McCaughan |
| 8,873,697 B2 | | 10/2014 | Horie et al. |
| 2008/0123795 A1 | * | 5/2008 | Hyde .................. G21C 15/243 376/463 |
| 2012/0255706 A1 | | 10/2012 | Tadayon et al. |
| 2012/0294404 A1 | * | 11/2012 | Wada ........................ G21C 9/06 376/256 |
| 2013/0114778 A1 | | 5/2013 | Horie et al. |
| 2013/0156143 A1 | | 6/2013 | Bingham |
| 2017/0133112 A1 | | 5/2017 | Singh et al. |
| 2018/0322967 A1 | * | 11/2018 | Malloy .................. G21C 15/18 |

FOREIGN PATENT DOCUMENTS

| | | |
|---|---|---|
| EP | 0596166 | 5/1994 |
| EP | 2814038 | 12/2014 |
| EP | 3093582 | 11/2016 |
| JP | 2015508486 | 3/2015 |
| KR | 101689481 B1 * | 12/2016 |

OTHER PUBLICATIONS

Hamdhan et al., "Determination of Thermal Conductivity of Coarse and Fine Sand Soils" Proceedings World Geothermal Congress 2010, Bali, Indonesia, Apr. 25, 2010.
Shcheklein, "Vapor-dynamic cooling systems for nuclear power plants" MATEC Web of Conferences 115, Jul. 10, 2017.
WIPO, Written Opinion of the ISA in Corresponding PCT Application PCT/US2018/063730, dated Mar. 18, 2019.
EPO, Partial Supplementary European Search Report in corresponding application EP18886845.9, dated Jul. 14, 2021.
EPO, Extended European Search Report in corresponding application EP18886845.9, dated Feb. 2, 2022.

* cited by examiner

METHODS OF CONSTRUCTING NUCLEAR POWER PLANTS WITH GEOTHERMAL PASSIVE COOLING

RELATED APPLICATIONS

This application claims priority under 35 U.S.C. § 119 to U.S. Provisional Application 62/594,528, filed Dec. 4, 2017 and incorporated by reference herein in its entirety.

BACKGROUND

FIG. 1 is a profile cross-section of a related art liquid metal nuclear reactor, such as that described in co-owned U.S. Pat. No. 5,406,602 to Hunsbedt et al. issued Apr. 11, 1995, incorporated herein in its entirety by reference. As seen in FIG. 1, annular or circular concrete silo 8, potentially underground, houses annular containment vessel 2 that in turn houses reactor 1, potentially all concentrically aligned. Reactor 1 includes a nuclear reactor core 12 submerged in a liquid metal coolant, such as liquid sodium. A space, shown as gap 3, between reactor 1 and containment vessel 2 may be filled with an inert gas, such as argon. Reactor 1 and containment vessel 2 are suspended vertically downward from upper frame 16. Concrete silo 8 may support upper frame 16 by seismic isolators 18 to maintain structural integrity of containment vessel 2 and reactor 1 during earthquakes and allow uncoupled movement between those structures and surrounding silo 8.

Reactor 1 is controlled by neutron-absorbing control rods 15 selectively inserted into or withdrawn from reactor core 12. Reactor 1 may be shut down entirely for responding to an emergency condition or performing routine maintenance by inserting control rods 15 into core 12 of fissionable fuel to deprive the fuel of the needed fission-producing neutrons. However, residual decay heat continues to be generated from core 12 decreasing exponentially over time. This heat must be dissipated from shut-down reactor 1. The heat capacity of the liquid metal coolant and adjacent reactor structures aid in dissipating the residual heat. For instance, heat may be transferred by thermal radiation from reactor 1 to containment vessel 2. Heat from containment vessel 2 may also radiate outwardly toward concrete silo 8 spaced outwardly therefrom.

Systems for removal of this decay heat vent or otherwise remove the heat from reactor 1 and surround structures to a heat sink such as the environment. One such system may be a reactor vessel auxiliary cooling system (RVACS) as shown in FIG. 1. Heat collector cylinder 5 may be concentrically between containment vessel 2 and silo 8 and define hot air riser 4 between containment vessel 2 and an inner surface of heat collector cylinder 5. Heat collector cylinder 5 may further define cold air downcomer 7 between silo 8 and an outer surface of heat collector cylinder 5. Heat may be transferred from containment vessel 2 to air in hot air riser 4. The inner surface of heat collector cylinder 5 may receive thermal radiation from containment vessel 2, with the heat therefrom being transferred by natural convection into the rising air for upward flow to remove the heat via air outlets 9. Heating of the air in riser 4 by the two surrounding hot surfaces induces natural air draft in the system with atmospheric air entering through air inlets 6 above ground level. The air from inlets 6 is ducted to cold air downcomer 7, then to the bottom of concrete silo 8, where it turns and enters hot air riser 4. The hot air is ducted to air outlets 9 above ground level.

Similar, related passive reactor coolant systems are described in U.S. Pat. No. 5,190,720 to Hunsbedt et al., issued Mar. 2, 1993, and U.S. Pat. No. 8,873,697 to Horie et al., issued Oct. 28, 2014, all of which are incorporated herein by reference in their entireties. Co-owned U.S. patent application Ser. No. 15/785,548 filed Oct. 17, 2017 to Sineath et al. is incorporated herein by reference in its entirety. Hamdhan et al., "Determination of Thermal Conductivity of Coarse and Fine Sand Soils" Proceedings World Geothermal Congress 2010, Bali, Indonesia, Apr. 25, 2010 is incorporated herein in its entirety. US Patent Publication 2012/0255706 to Tadayon et al. published Oct. 11, 2012; U.S. Pat. No. 4,851,183 to Hampel, issued Jul. 25, 1989; U.S. Pat. No. 5,816,314 to Wiggs et al., issued Oct. 6, 1989; U.S. Pat. No. 7,617,697 to McCaughan, issued Nov. 17, 2009; Chinese Patent Publication 102032716 published Apr. 27, 2011; U.S. Pat. No. 7,048,037 to McNair issued Dec. 9, 2003; U.S. Pat. No. 6,814,866 to Potts issued Nov. 9, 2004; and U.S. Pat. No. 5,223,210 to Hunsbedt issued Jun. 29, 1993 are all incorporated herein by reference in their entireties.

SUMMARY

Example embodiments include passive safety systems and reactors including the same. Example embodiment safety systems remove unwanted heat from a reactor vessel with a coolant flow channel surrounding the reactor that passes through surrounding ground as a heat sink. The coolant flow channel may be divided into a downcomer and riser that loop around the reactor and then pass outside, potentially through a containment building, into surrounding ground. Any type of reactor may be used, including light water, gas-cooled, or PRISM-type reactors using a molten metal or molten salt as a primary thermal exchange fluid that need not operate during cooling by example embodiment passive cooling systems. Indeed, no active components may be used in example embodiment safety systems, which may be driven entirely by gravity-based natural circulation. A passive damper system may work without power in the coolant loop to open the conduit at a threshold temperature.

The coolant loop may be air-tight and seismically-hardened and filled with any coolant such as water, air, nitrogen, a noble gas, a refrigerant, etc. The ground can be in direct contact with the loop, and may include a soil of grey limestone, soft grey fine sandy clay, grey slightly silty sandy gravel, etc. or any other fill with desired heat-transfer characteristics. Coolant fins and/or jackets with secondary coolants may be used on the coolant loop to enhance heat transfer and enlarge the ground volume available for absorbing heat. The coolant loop may be buried at any constant or variable depth, and the reactor and containment may also be buried in the ground.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the terms which they depict.

DETAILED DESCRIPTION

Figure 1:
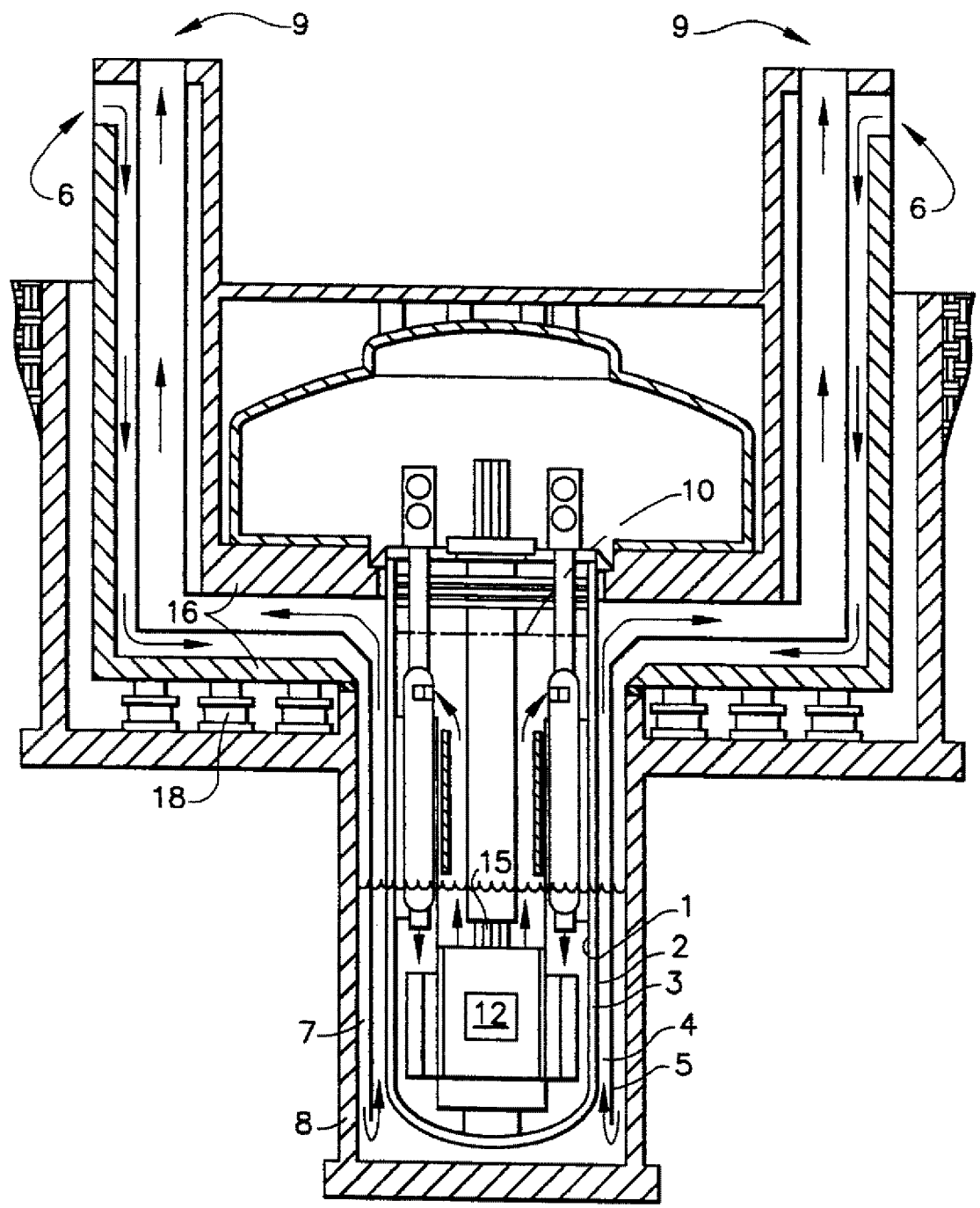
FIG. 1 is a profile schematic of a related art reactor vessel auxiliary cooling system (RVACS).

Because this is a patent document, general, broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the ordinal terms "first," "second," etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and the are intended to include both the singular and plural forms, unless the language explicitly indicates otherwise. Indefinite articles like "a" and "an" introduce or refer to any modified term, both previously-introduced and not, while definite articles like "the" refer to the same previously-introduced term. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

As used herein, "below ground" "underground" and "in ground" include any and all positions below a grade or a horizon or a natural earth surface about a nuclear power plant in a manner that cannot be accessed from directly above without digging, excavation, or other surface removal. For example, these terms would include burying an element in soil that then covers the element, positioning an element in a container or structure under earth, and building up ground around an element to create a grade above the element.

The Inventors have recognized that related passive coolant systems such as RVACS that utilize above-ground chimneys and a fluid medium may dissipate several dozen megawatts thermal decay heat in certain reactor designs, but this may be unnecessary for smaller reactors, especially liquid-metal-coolant-based reactors such as a PRISM reactor. The Inventors have recognized that smaller reactors that generate up to 20 megawatts thermal decay heat in a shutdown condition can be satisfactorily cooled by a solid media heat sink, including soils. The Inventors have further recognized that related art RVACS with large above-ground cooling structures represent a further accident vector due to aircraft strikes, weather, and attacks facilitated by their accessible position. To overcome these newly-recognized problems as well as others, the inventors have developed example embodiments and methods described below to address these and other problems recognized by the inventors with unique solutions enabled by example embodiments.

The present invention is geothermal reactor cooling systems, reactors containing the same, and methods of using the same in nuclear reactors. In contrast to the present invention, the few example embodiments and example methods discussed below illustrate just a subset of the variety of different configurations that can be used as and/or in connection with the present invention.

Figure 2:
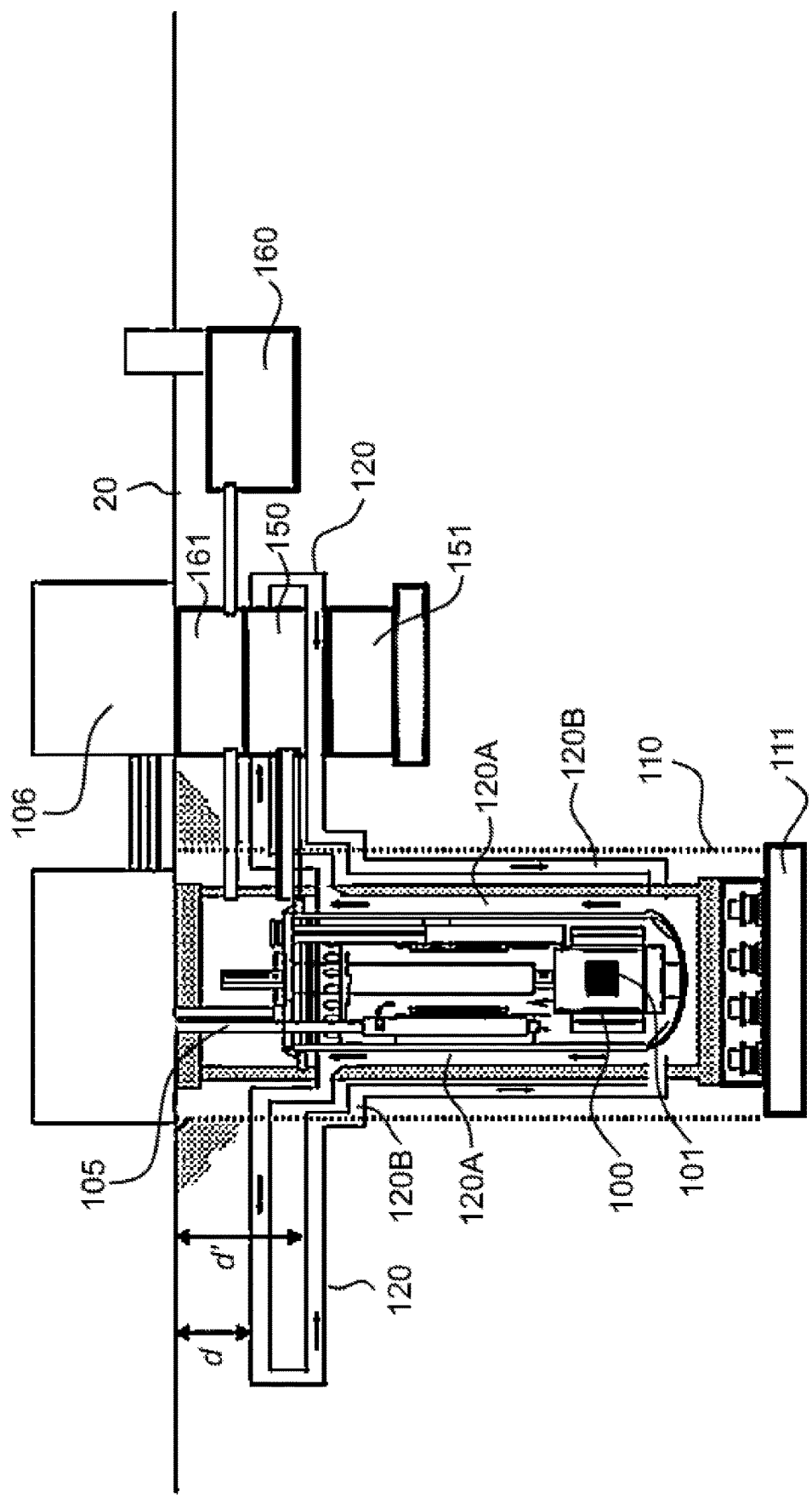
FIG. 2 is a schematic of an example embodiment nuclear power plant.

As shown in FIG. 2, an example embodiment plant includes nuclear reactor 100 with core 101 completely underground. In the instance of a PRISM reactor, primary coolant loop, including a liquid metal such as sodium or salt heat exchange coolant, may be buried, potentially in limited containment structure 110 with basemat structure 111. Only intermediate or non-primary heat exchange loops 105 may be positioned above ground to power turbine and generator 106.

Loss or damage to intermediate heat exchange loop 105, turbine, and generator 106, and even non-operation of emergency pump 161 and control room 160 operation of the reactor and plant components, generally does not risk damage to reactor 100, which uses a self-contained primary coolant below ground. For example, the reactor shown in FIG. 2 may be largely identical to other PRISM reactors, such as those described in the incorporated documents to Hunsbedt or Sineath, except entirely underground and with an RVACS replaced with example embodiment geothermal decay heat removal loop 120.

As shown in FIG. 2, RVACS-like example embodiment geothermal coolant loop 120 may flow directly around the reactor vessel or conductive structures of the same and absorb heat from the reactor. In the example of a shut-down PRISM reactor, upward-flowing conduit 120A may absorb up to 20 megawatts thermal, and likely 1-2 megawatts thermal for smaller modular PRISM reactors or 100 kilowatts thermal for the PRISM-10 reactor design, from the shutdown reactor. Upward conduit 120A may run a height of reactor 100, potentially several meters, about a perimeter of reactor 100. Upward conduit 120A may take on the form of a heat pipe that is additively manufactured with the reactor vessel itself, allowing maximized heat transfer between reactor 100 and upward flowing conduit 120A. This height and heat absorbed along reactor 100 may drive natural convection in conduit 120, where the hotter fluid is driven upward in the loop due to a density gradient.

Upward conduit 120A may then exit containment 110 and reactor support structures to below-ground geothermal cooling loop 120, which may be buried several feet in soil or other surface media, including all soil and media types disclosed in the incorporated Hamdhan document. Burying depth d may be, for example, 1-20 feet, or any depth that is sufficient to provide sufficient heat capacity while protecting loop 120 from surface damage and also minimizing construction costs. Or for example, depth d may be several hundred or thousands of feet deep to take advantage of a deeper geothermal heat sink. Cooling loop 120 is shown in FIG. 2 at varying buried depths d and d' growing deeper with length to enhance natural circulation with a gravity gradient in the direction of cooler temperatures, and it is understood that loop 120 may alternatively be at a same or consistent depth, where d=d'.

Loop 120 may flow through cold trap 150 and/or shutdown control 151 that may condition and control flow through loop 120. For example, cold trap 150 may condense out vapor that accumulates in loop 120, and shutdown control 151 may include a damper or other flow restrictor to limit or allow flow through loop 120 depending on heat sink needs.

Loop 120B includes downward conduit 120B to then direct cooled coolant in loop 120 back to reactor 101. As shown in FIG. 2, after passing through ground 20 and transferring heat to the same, conduit 120 flows back down and into reactor containment 110 and support structures, forming a loop with upward conduit 120A. Again, due to the cooled fluid in downward conduit 120B, this may drive natural circulation in loop 120. In this way, with the cooler heat sink of the soil vertically above the tall reactor heat source, natural convection may occur in conduit 120 to aid heat transfer away from reactor 100. In this way, example embodiment geothermal heat sink system may be largely passive and automatic, transferring heat away from the reactor at the decay heat generation rate without any pump, fan, etc.

Of course, conditional and active components may be used in example embodiments. For example, the damper system from the incorporated Sineath document may passively close conduit 120 during normal operation to avoid loss of heat useable for energy generation. Or, for example, a meltable plug may be used in conduit 120 to open the same when reaching a temperature associated with needing emergency or shutdown cooling. Or, for example, conduit 120 may be allowed to freeze or include a heavy, non-condensable gas that plugs or insulates conduit 120 during normal operation but is pushed out of the conduit into a reservoir as reactor 100 and coolant approach emergency temperatures. Active blowers, coolant injectors and other systems may optionally be used to drive additional convection if desired.

Figure 3:
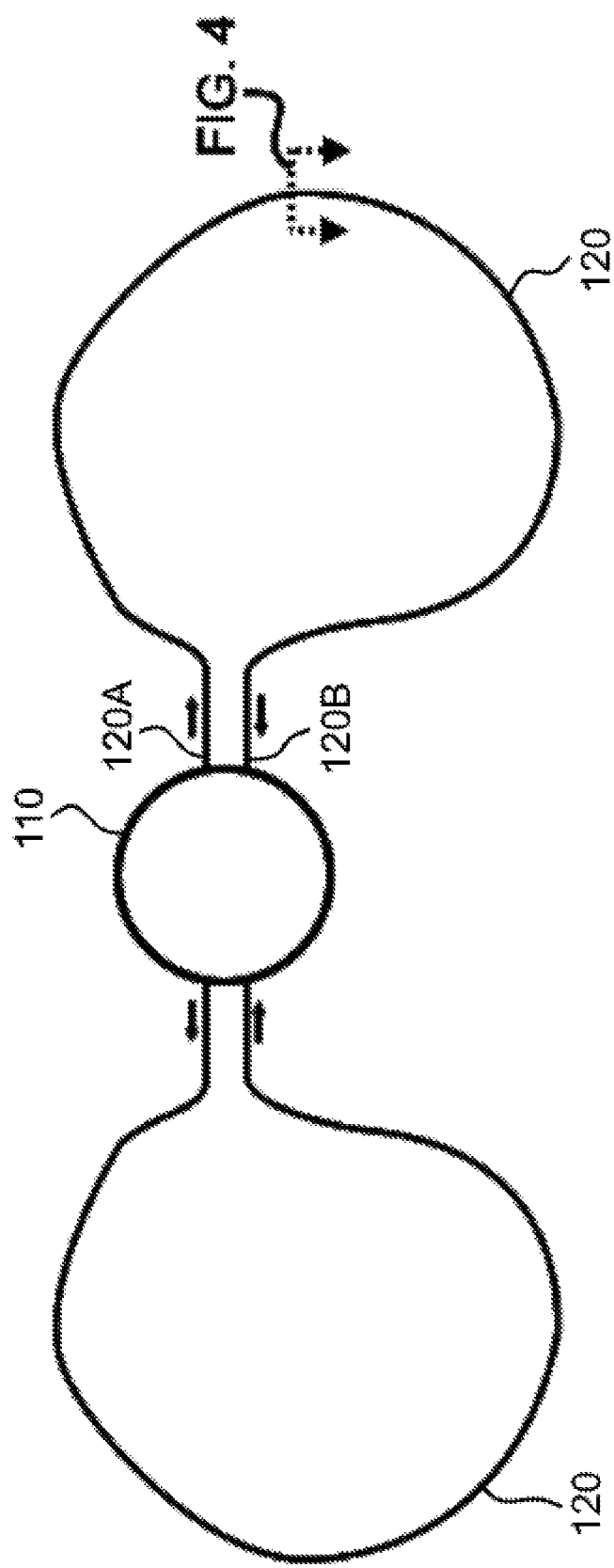
FIG. 3 is a schematic of an example embodiment geothermal coolant loop for the nuclear power plant of FIG. 2.

As shown in FIG. 3, multiple loops 120 may be used, flowing from upward conduits 120A into loop 120. Based on the thermal capacities described in the incorporated Hamdhan document, and expected ground temperatures around 55-degrees-Fahrenheit due to geothermal effects, loops 120 may effectively dissipate decay heat. Owing to geothermal dissipation effects, the surrounding soil may indefinitely act as a heat sink for the reactor decay heat, up to, for example, 20 megawatts thermal, for a larger, 10-inch diameter conduit 120 that is a few hundred feet long in length in the ground around reactor and containment 110.

Figure 4A:
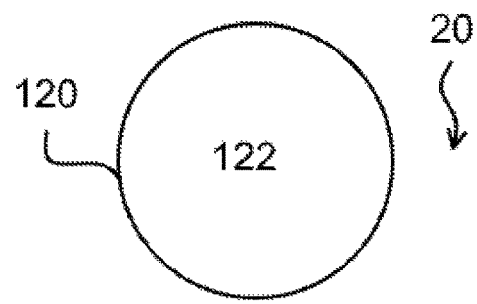
FIGS. 4A-4C are cross-sectional views of a cooling loop pipe useable in the example embodiment geothermal coolant loop of FIG. 3.
Figure 4B:
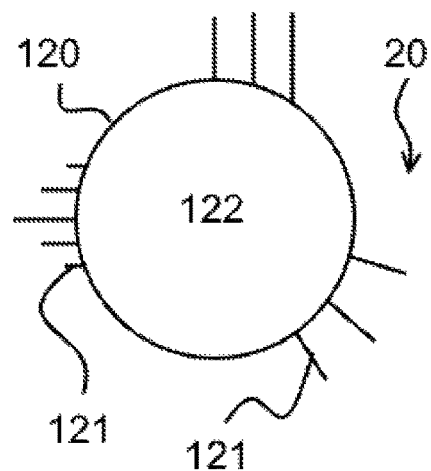
Figure 4C:
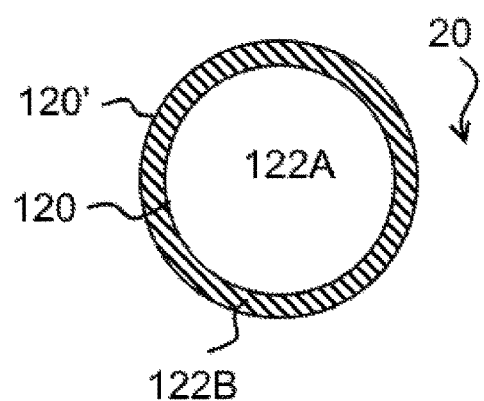

As shown in FIGS. 4A-C, conduit 120 may be generally surrounded by ground 20 or other heat-sink medium surrounding conduit 120. Conduit 120 may take on several different configurations, depending on desired heat exchange characteristics. For example, conduit 120 may be a thin, high-thermal-conductive material tube as shown in FIG. 4A that may carry coolant 122. Similarly, as shown in FIG. 4B, one or more cooling fins 121 may extend into surrounding ground 20 to further aid heat transfer and cooling. As shown in FIG. 4C, conduit 120 may be surrounded by a further jacket or outer conduit 120', such as a pipe-in-pipe design with secondary coolant 122B, such as water or another heat sink, surrounding primary conduit 120 with primary coolant 122A. Still further, conduit 120 may divide into several smaller channels such as in a heat exchanger design. Conduit 120 may be of any size, shape, configuration, and length, based on desired heat sink capacity and known thermal properties of the surrounding ground.

Figure 5:
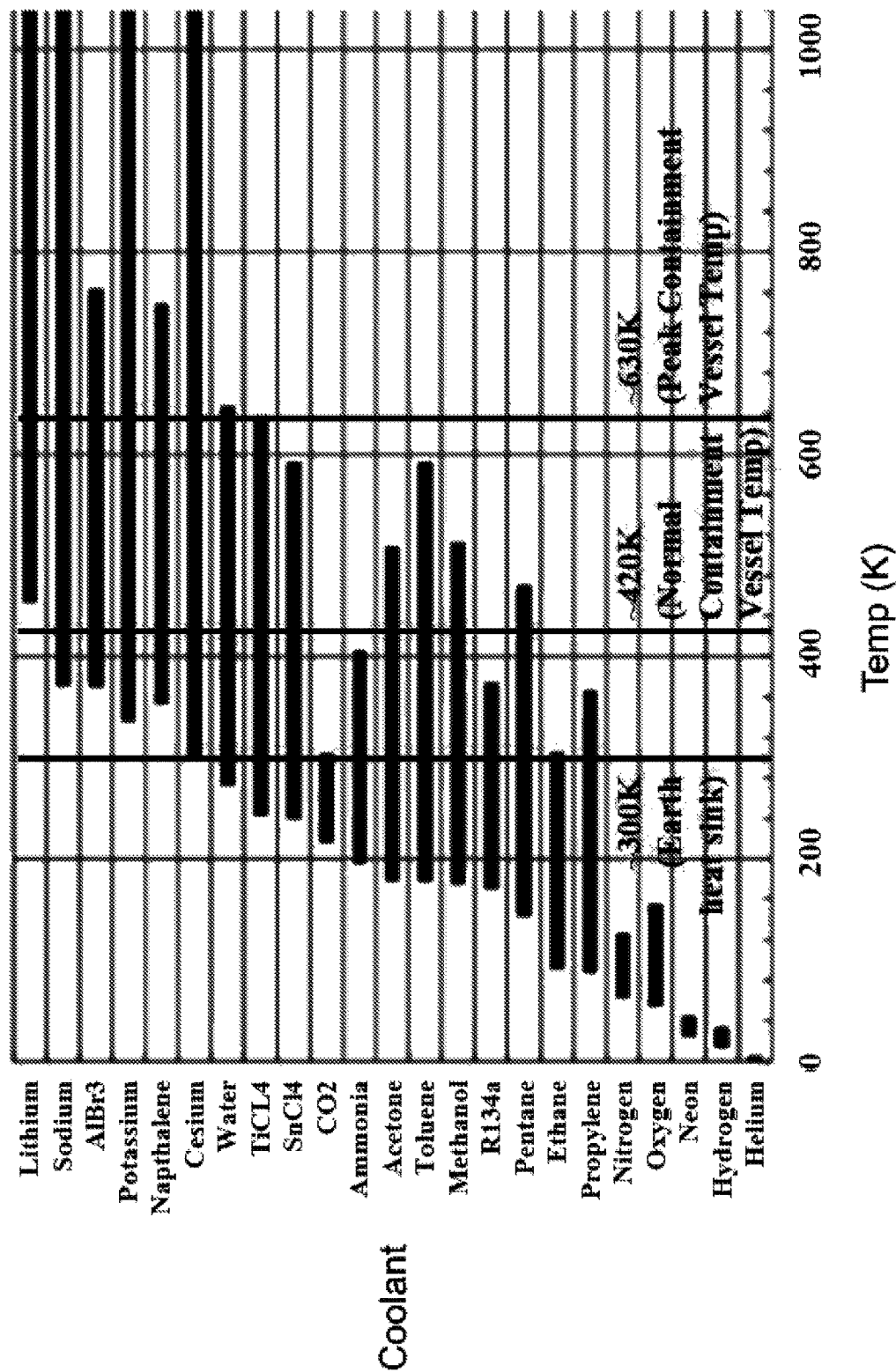
FIG. 5 is a graph showing liquid and gas phases of coolants useable in example embodiment coolant loops by temperature.

Fluid coolant 122 flowing through conduit 120 may be any fluid capable of carrying expected decay heat loads while flowing under natural convection. For example, air, nitrogen, helium, a refrigerant, water, etc. may all be used in the underground coolant loop, as well as any other fluid shown FIG. 5, illustrating liquid phase ranges (with gas phases thereafter) of several potential coolant fluids. Similarly, the type of ground soil or fill surrounding the loop may be based on soil naturally available at the site or purposefully configured for heat conductivity. For example, finer sandy clays with higher thermal conductivity and heat capacity may be used to bury the conduit if natural ground does not have desired heat conducting properties. To maximize the liquid return rate of coolant 122, a thermosyphon effect may be maximized by using available elevation gain in the conduit supplemented by sintered wick design and by separating vapor and liquid legs.

Because the reactor in the example embodiment system, as well as the geothermal coolant conduit may be several feet underground and passively cooled, risk of above-ground damage, such as weather incidents, collisions, explosions, bad actors, etc. is reduced or eliminated due to the lack of accessibility of both the reactor and its emergency coolant system provided by the conduit. Of course, integrity and functionality monitoring of the conduit may also be used, such as by maintaining and measuring a pressurization in the conduit to detect leaks, seismic hardening the conduit with flexible connections and potentially shock absorbers or snubbers, installing regulatory-grade leak seals about containment penetrations, etc.

Example embodiments and methods thus being described, it will be appreciated by one skilled in the art that example embodiments may be varied and substituted through routine experimentation while still falling within the scope of the following claims. For example, although a fully underground reactor with above-ground turbine and generator is shown, other above-and-below combinations of any element can be used simply through proper positioning of example embodiments—and fall within the scope of the claims. Such variations are not to be regarded as departure from the scope of these claims.

What is claimed is:

1. A method of constructing a nuclear power plant including a reactor vessel housing a core, a coolant downcomer conduit located outside of the reactor vessel, a coolant heat riser conduit located outside of and next to the reactor vessel, and a containment structure surroundingly enclosing each of the reactor vessel, the coolant downcomer conduit, and the coolant heat riser conduit, the method comprising:

burying a coolant conduit in soil outside of the containment structure; and fluidly connecting the coolant conduit to the coolant heat riser conduit and the coolant downcomer conduit so as to form a closed loop, wherein at least one portion of the closed loop passes through the containment structure, and wherein the closed loop allows fluid to flow via natural convection from the coolant heat riser conduit, then through the coolant conduit, and then into the coolant downcomer conduit.

2. The method of claim 1, further comprising:

burying the containment structure below the coolant conduit such that the reactor vessel, the coolant heat riser conduit, and the coolant downcomer conduit are below the coolant conduit.

3. The method of claim 1, wherein the burying includes burying the coolant conduit approximately 3-6 feet in soil.

4. The method of claim 3, wherein the soil is in direct contact with the coolant conduit, and wherein the soil includes at least one of grey limestone, soft grey fine sandy clay, and grey slightly silty sandy gravel.

5. The method of claim 1, wherein the coolant conduit is fluid-tight and filled with at least one of water, air, nitrogen, a noble gas, and a refrigerant.

6. The method of claim 1, wherein burying includes burying the coolant conduit in soil at a depth that increases as the coolant conduit proceeds from the coolant heat riser conduit to the coolant downcomer conduit.

7. The method of claim 1, wherein the burying includes burying the coolant conduit in direct contact with soil for over 100 feet of a length of the coolant conduit.

8. The method of claim 1, further comprising:

connecting the coolant conduit to a cold trap between the coolant heat riser conduit and the coolant downcomer conduit, wherein the cold trap is configured to remove impurities from fluid in the coolant conduit.

9. The method of claim 1, wherein the coolant conduit includes a primary central conduit and a secondary surrounding conduit configured to carry a secondary coolant.

10. The method of claim 1, wherein the burying includes burying in direct contact with soil at least one cooling fin connected directly to the coolant conduit.

11. The method of claim 1, wherein the burying places only ground above at least a portion of the coolant conduit such that there is no structure between the portion, the ground, and a top surface of the ground, and wherein the coolant conduit, the coolant heat riser conduit, and the coolant downcomer conduit form a closed loop for a gas that is different than a primary loop for the core.

12. The method of claim 1, wherein the burying includes burying the coolant conduit in direct contact with soil forming the ground, the method further comprising:

filing the coolant conduit with a fluid different than a primary coolant flowing inside the reactor vessel.

* * * * *